US009477478B2

(12) United States Patent
Kothari et al.

(10) Patent No.: US 9,477,478 B2
(45) Date of Patent: Oct. 25, 2016

(54) MULTI LEVEL INDIRECT PREDICTOR USING CONFIDENCE COUNTER AND PROGRAM COUNTER ADDRESS FILTER SCHEME

(75) Inventors: Kulin N. Kothari, Cary, NC (US); Michael William Morrow, Cary, NC (US); James Norris Dieffenderfer, Apex, NC (US); Michael Scott McIlvaine, Raleigh, NC (US); Brian Michael Stempel, Raleigh, NC (US); Daren Eugene Streett, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 915 days.

(21) Appl. No.: 13/472,950

(22) Filed: May 16, 2012

(65) Prior Publication Data
US 2013/0311760 A1 Nov. 21, 2013

(51) Int. Cl.
*G06F 9/38* (2006.01)

(52) U.S. Cl.
CPC ........... *G06F 9/3806* (2013.01); *G06F 9/3844* (2013.01); *G06F 9/3848* (2013.01)

(58) Field of Classification Search
None
See application file for complete search history.

(56) References Cited

U.S. PATENT DOCUMENTS

| 5,933,628 | A * | 8/1999 | Chang ........................... 712/233 |
| 6,721,877 | B1 | 4/2004 | Chen et al. |
| 7,434,037 | B2 | 10/2008 | Park et al. |
| 7,818,551 | B2 | 10/2010 | Joao et al. |
| 7,870,371 | B2 | 1/2011 | Mutlu et al. |
| 2003/0065912 | A1 * | 4/2003 | Hum et al. ..................... 712/239 |
| 2003/0212882 | A1 | 11/2003 | Bonanno et al. |
| 2004/0172524 | A1 * | 9/2004 | Hoogerbrugge ............... 712/239 |
| 2005/0257036 | A1 * | 11/2005 | Prasky et al. .................. 712/239 |
| 2006/0026408 | A1 * | 2/2006 | Morris et al. .................. 712/239 |
| 2006/0242393 | A1 * | 10/2006 | Park et al. ..................... 712/240 |
| 2007/0088937 | A1 | 4/2007 | Archambault et al. |
| 2011/0078425 | A1 * | 3/2011 | Shah et al. ..................... 712/239 |
| 2012/0079255 | A1 * | 3/2012 | Combs et al. ................. 712/239 |

OTHER PUBLICATIONS

Tao Li, Ravi Bhargava and Lizy Kurian John. "Rehashable BTB: An Adaptive Branch Target Buffer to Improve the Target Predictability of Java Code" HiPC 2002, LNCS 2552, pp. 597-608, 2002.*
Hai Li, Swarup Bhunia, Yiran Chen, T. N. Vijaykumar, and Kaushik Roy. "Deterministic Clock Gating for Microprocessor Power Reduction" Proceedings of the The Ninth International Symposium on High-Performance Computer Architecture (HPCA-9'03). 2002 IEEE.*
Florea A. et al., "Advanced techniques for improving indirect branch prediction accuracy", Proceedings of 19th European Conference on Modeling and Simulation, Jun. 2005, pp. 750-759.
Driesen K et al: "The cascaded predictor: economical and adaptive branch target Prediction", MICRO-31. Proceedings of the 31st. Annual ACM/IEEE International Symposium on Microarchitecture. Dallas, TX, Nov. 30-Dec. 2, 1998; [Proceedings of the Annual ACM/IEEE International Symposium on Microarchitecture], Los Almitos, CA: IEEE Comp. Soc, Nov. 30, 1998, pp. 249-258, XP010318254.
International Search Report and Written Opinion—PCT/US2013/041293—ISA/EPO—Jul. 4, 2013.

* cited by examiner

*Primary Examiner* — Jacob A Petranek
(74) *Attorney, Agent, or Firm* — Linda G. Gunderson (57) ABSTRACT

The disclosure relates to predicting simple and polymorphic branch instructions. An embodiment of the disclosure detects that a program instruction is a branch instruction, determines whether a program counter for the branch instruction is stored in a program counter filter, and, if the program counter is stored in the program counter filter, prevents the program counter from being stored in a first level predictor.

17 Claims, 5 Drawing Sheets

MULTI LEVEL INDIRECT PREDICTOR USING CONFIDENCE COUNTER AND PROGRAM COUNTER ADDRESS FILTER SCHEME

FIELD OF DISCLOSURE

Embodiments of the disclosure relate to predicting simple and polymorphic branch instructions, and more particularly to distinguishing between simple and polymorphic branch instructions.

BACKGROUND

During program instruction execution at the microprocessor level, an indirect branch instruction may cause execution to jump to a non-sequential instruction somewhere else in the program, rather than the next sequential instruction. Predicting to which instruction the execution will branch is an important optimization. There are two types of predictable indirect branches, "simple" indirect branches and "polymorphic" indirect branches. "Simple" indirect branches are branches that keep jumping to the same target instruction. "Polymorphic" indirect branches are branches that jump to different target instructions in a specific pattern that is usually predictable.

A global indirect branch predictor stores a history of the correct target for all conditional branches. Simple indirect branches do not need a global branch history for accurate prediction, but polymorphic indirect branches do. While building a large monolithic indirect predictor that uses global branch history may solve the problem, it is not feasible to build such an array from an area and timing perspective of a processor. Multiple clock cycles would be needed to lookup such a large predictor and that may have a negative impact on the performance of the application.

Further, in many cases, using global branch history can harm simple branches in a two-fold way. First, it may provide a bad prediction of simple branches while the global branch history is being populated. Second, the same branch may now be stored in multiple entries of the indirect predictor array, creating a capacity problem even though it would have been perfectly acceptable to allocate the simple branch in only one entry because it always jumps to the same target.

What is needed is a way to predict both simple and polymorphic indirect branches accurately without negatively impacting the timing or the performance of the processor.

SUMMARY

The disclosure relates to predicting simple and polymorphic branch instructions. An embodiment of the disclosure detects that a program instruction is a branch instruction, determines whether a program counter for the branch instruction is stored in a program counter filter, and, if the program counter is stored in the program counter filter, prevents the program counter from being stored in a first level predictor.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

It will be appreciated that configured logic or "logic configured to" are not limited to specific logic gates or elements, but generally refer to the ability to perform the functionality described herein (either via hardware or a combination of hardware and software). Thus, the configured logics or "logic configured to" are not necessarily implemented as logic gates or logic elements despite sharing the word "logic." Other interactions or cooperation between the logic in the various blocks will become clear to one of ordinary skill in the art from a review of the embodiments described below in more detail.

Figure 1:
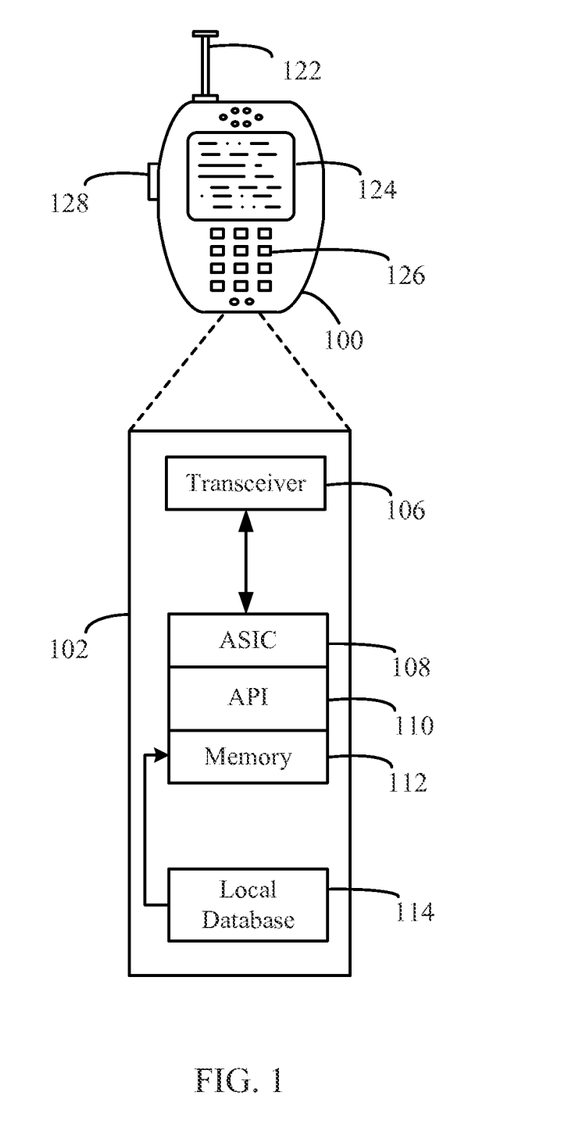
FIG. 1 illustrates an exemplary user equipment in accordance with at least one embodiment of the invention.

Referring to FIG. 1, a user equipment (UE) 100, (here a wireless device), such as a cellular telephone, has a platform 102 that can receive and execute software applications, data and/or commands transmitted from a radio access network (RAN) that may ultimately come from the core network, the Internet and/or other remote servers and networks. The platform 102 can include a transceiver 106 operably coupled to an "ASIC" 108, or other processor, microprocessor, logic circuit, or other data processing device. The ASIC 108 or other processor executes the application programming interface ("API') 110 layer that interfaces with any resident programs in the memory 112 of the wireless device. The memory 112 can be comprised of read-only or random-access memory (RAM and ROM), EEPROM, flash cards, or any memory common to computer platforms. The platform 102 also can include a local database 114 that can hold applications not actively used in memory 112. The local database 114 is typically a flash memory cell, but can be any secondary storage device as known in the art, such as magnetic media, EEPROM, optical media, tape, soft or hard disk, or the like. The internal platform 102 components can also be operably coupled to external devices such as antenna 122, display 124, push-to-talk button 128 and keypad 126 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 108, memory 112, API 110 and local database 114 may all be used cooperatively to load, store and execute the various functions disclosed herein and thus the logic to perform these functions may be distributed over various elements. Alternatively, the functionality could be incorporated into one discrete component. Therefore, the features of the UE 100 in FIG. 1 are to be considered merely illustrative and the invention is not limited to the illustrated features or arrangement.

The wireless communication between the UE 100 and the RAN can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), 3GPP Long Term Evolution (LTE) or other protocols that may be used in a wireless communications network or a data communications network. Accordingly, the illustrations provided herein are not intended to limit the embodiments of the invention and are merely to aid in the description of aspects of embodiments of the invention.

Figure 2:
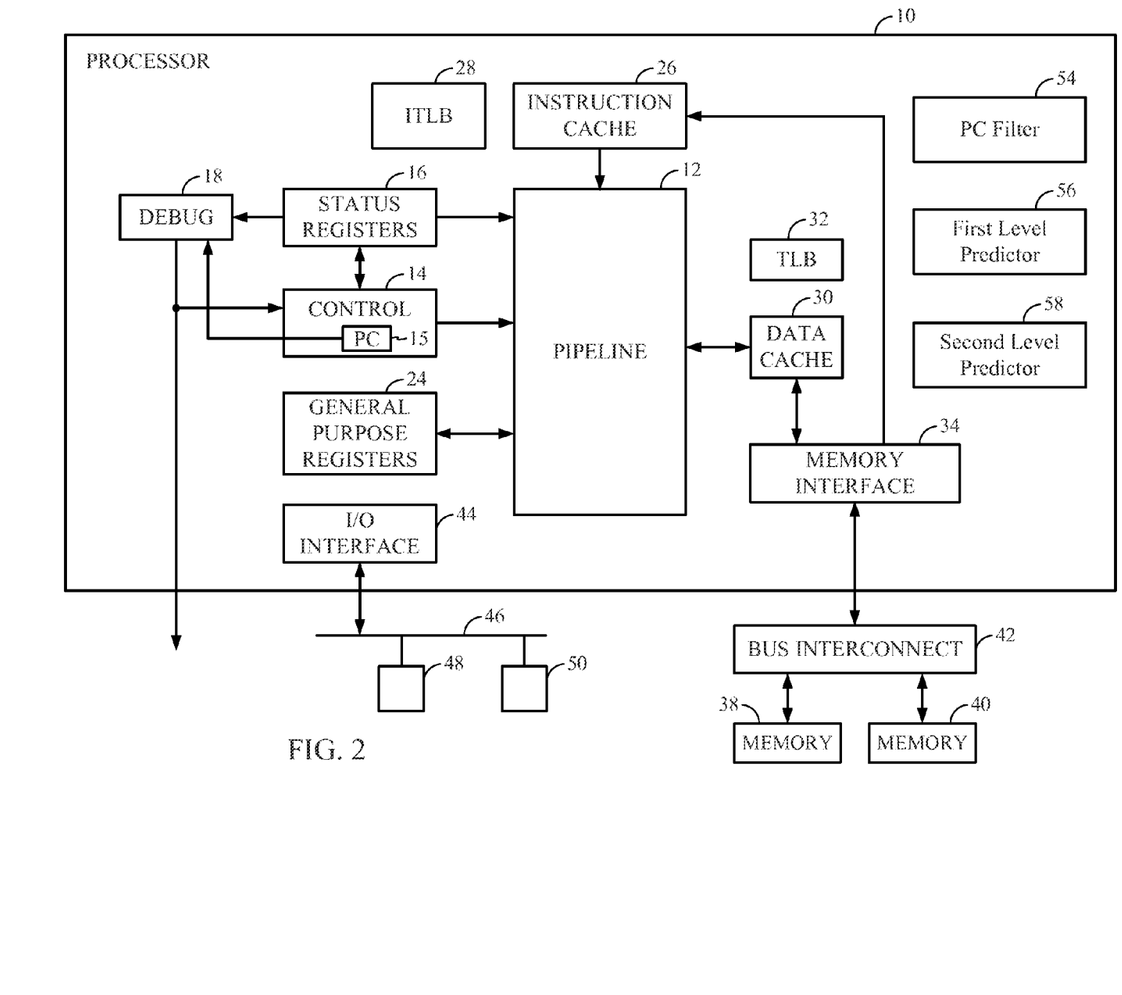
FIG. 2 illustrates an exemplary processor in accordance with at least one embodiment of the invention.

FIG. 2 depicts a functional block diagram of an exemplary processor 10, such as ASIC 108, according to an embodiment of the invention. Processor 10 executes instructions in an instruction execution pipeline 12 according to control logic 14. The control logic 14 maintains a Program Counter (PC) 15, and sets and clears bits in one or more status registers 16 to indicate, e.g., the current instruction set operating mode, information regarding the results of arithmetic operations and logical comparisons (zero, carry, equal, not equal), and the like. In some embodiments, the pipeline 12 may be a superscalar design, with multiple, parallel pipelines. The pipeline 12 may also be referred to as an execution unit. A General Purpose Register (GPR) file 24 provides registers accessible by the pipeline 12, and comprising the top of the memory hierarchy.

The processor 10, which executes instructions from at least two instruction sets in different instruction set operating modes, additionally includes a debug circuit 18, operative to compare, upon the execution of each instruction, at least a predetermined target instruction set operating mode to the current instruction set operating mode, and to provide an indication of a match between the two.

The pipeline 12 fetches instructions from an instruction cache (I-cache) 26, with memory address translation and permissions managed by an Instruction-side Translation Lookaside Buffer (ITLB) 28. Data is accessed from a data cache (D-cache) 30, with memory address translation and permissions managed by a main Translation Lookaside Buffer (TLB) 32. In various embodiments, the ITLB 28 may comprise a copy of part of the TLB 32. Alternatively, the ITLB 28 and TLB 32 may be integrated. Similarly, in various embodiments of the processor 10, the I-cache 26 and D-cache 30 may be integrated, or unified. Further, I-cache 26 and D-cache 30 may be L1 caches. Misses in the I-cache 26 and/or the D-cache 30 cause an access to main (off-chip) memory 38, 40 by a memory interface 34. The memory interface 34 may be a master input to a bus interconnect 42 implementing a shared bus to one or more memory devices 38, 40. Additional master devices (not shown) may additionally connect to the bus interconnect 42.

The processor 10 may include an Input/Output (I/O) interface 44, which may be a master device on a peripheral bus 46, across which the I/O interface 44 may access various peripheral devices 48, 50. Those of skill in the art will recognize that numerous variations of the processor 10 are possible. For example, the processor 10 may include a second-level (L2) cache for either or both the I and D caches 26, 30. In addition, one or more of the functional blocks depicted in the processor 10 may be omitted from a particular embodiment. Other functional blocks that may reside in the processor 10, such as a JTAG controller, instruction predecoder, global branch history cache, and the like, are omitted for clarity.

Embodiments of the invention distinguish between simple and polymorphic indirect branches. Simple indirect branches are placed in a first level predictor 56, which is a small, fast array that uses no global branch history, while polymorphic indirect branches are placed in a second level predictor 58, which is a larger array indexed using the PC combined with the global branch history. A PC filter 54 stores the PCs of branch instructions that have been determined to be polymorphic branches.

Figure 3:
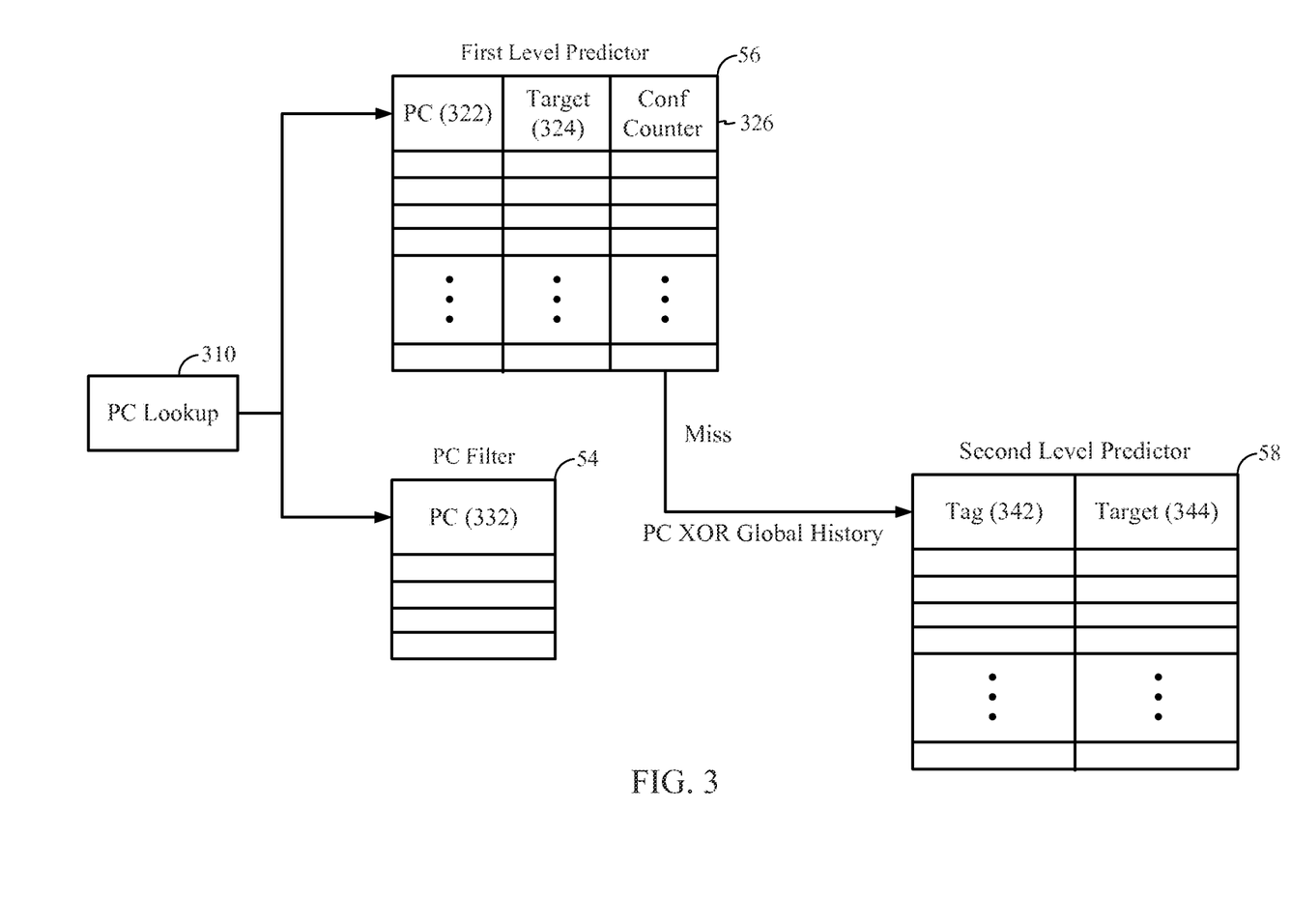
FIG. 3 illustrates the operation of a PC filter, a first level predictor, and a second level predictor according to at least one embodiment of the invention.

FIG. 3 illustrates the operation of PC filter 54, first level predictor 56, and second level predictor 58 according to an embodiment of the invention. When processor 10 first encounters the PC of a particular indirect branch instruction during program execution, as indicated by PC lookup 310, processor 10 allocates the PC of the branch, such as PC 322, the target address of the branch, such as target address 324, and a confidence counter, such as confidence counter 326, in first level predictor 56. In an alternate embodiment, first level predictor 56 may store the target instruction instead of the address of the target instruction.

A confidence counter, such as confidence counter 326, is allocated for each entry of first level predictor 56 to help determine the difference between simple and polymorphic branches. The confidence counter is an X-bit saturating counter (where X is usually 2 or 3) that counts up or down based on the prediction accuracy of first level predictor 56. The lower saturation value of the counter is 0 and the upper saturation value is $2^X-1$. For example, a 2-bit counter can have a value from 0 to 3.

As an example, given a 2-bit confidence counter with an initial value of Y=2, when first level predictor 56 predicts the branch correctly, the counter is incremented and saturates to the high value mark (i.e. 3). A correct prediction means that the target address stored in first level predictor 56 for the PC was the correct target address. Similarly, when first level predictor 56 predicts the branch incorrectly, the counter is decremented (i.e. to 1). An incorrect prediction means that the target address stored in first level predictor 56 for the PC was not the correct target address.

When the counter reaches a value of Z (e.g. Z=0), it means there is no confidence in the ability of first level predictor 56 to predict that particular branch correctly. This means that the branch is not a "simple" indirect branch, but is rather a "polymorphic" indirect branch. The PC and corresponding target address are therefore removed from first level predictor 56 and the PC, such as PC 332, is allocated in PC filter 54. PC filter 54 can have R entries, where R may be, for example, 1 to 4.

When the branch is encountered again, the PC for the branch will miss in first level predictor 56. Conventionally, when there is a miss for a PC in a first level cache (here, first level predictor 56), a second level cache (here, second level predictor 58) is checked. If present in the second level cache, the PC and target would be allocated from the second level cache to the first level cache. However, since the branch has been determined to be a polymorphic branch and therefore allocated in PC filter 54, and since global branch history is not used for first level predictor 56 (because simple branches always have the same target), that branch would be mispredicted again if moved back to first level predictor 56. The PC filter prevents this from happening. If a PC lookup, such as PC lookup 310, misses in first level predictor 56 and hits in PC filter 54, the corresponding branch instruction is not filled in to first level predictor 56 from second level predictor 58 because the branch is known to not be a "simple" branch (which is why the PC for that branch was stored in PC filter 54 in the first place). Instead, second level predictor 58 will be used to predict the branch instruction.

Second level predictor 58 stores a tag, such as tag 342, comprising the PC of the branch instruction XOR-ed with the global branch history for that branch and the corresponding target address, such as target address 344. Thus, if a PC lookup, such as PC lookup 310, misses in first level predictor 56 and hits in PC filter 54, second level predictor 58 is used to determine the target of the branch by XOR-ing the PC and global history.

If the PC misses in both first level predictor 56 and PC filter 54, it means the branch hasn't been encountered before and the PC is therefore allocated to first level predictor 56. If the PC hits in PC filter 54 and misses in second level predictor 58, it means there is no prediction for the target instruction. This may be, for example, because the branch is unpredictable, or because the number of possible jumps is too large to be stored in either the global branch predictor or second level predictor 58. It would be possible to design more levels for an indirect predictor, e.g. by using a larger global history for successive levels of an indirect predictor for more difficult to predict polymorphic branches.

Figure 4:
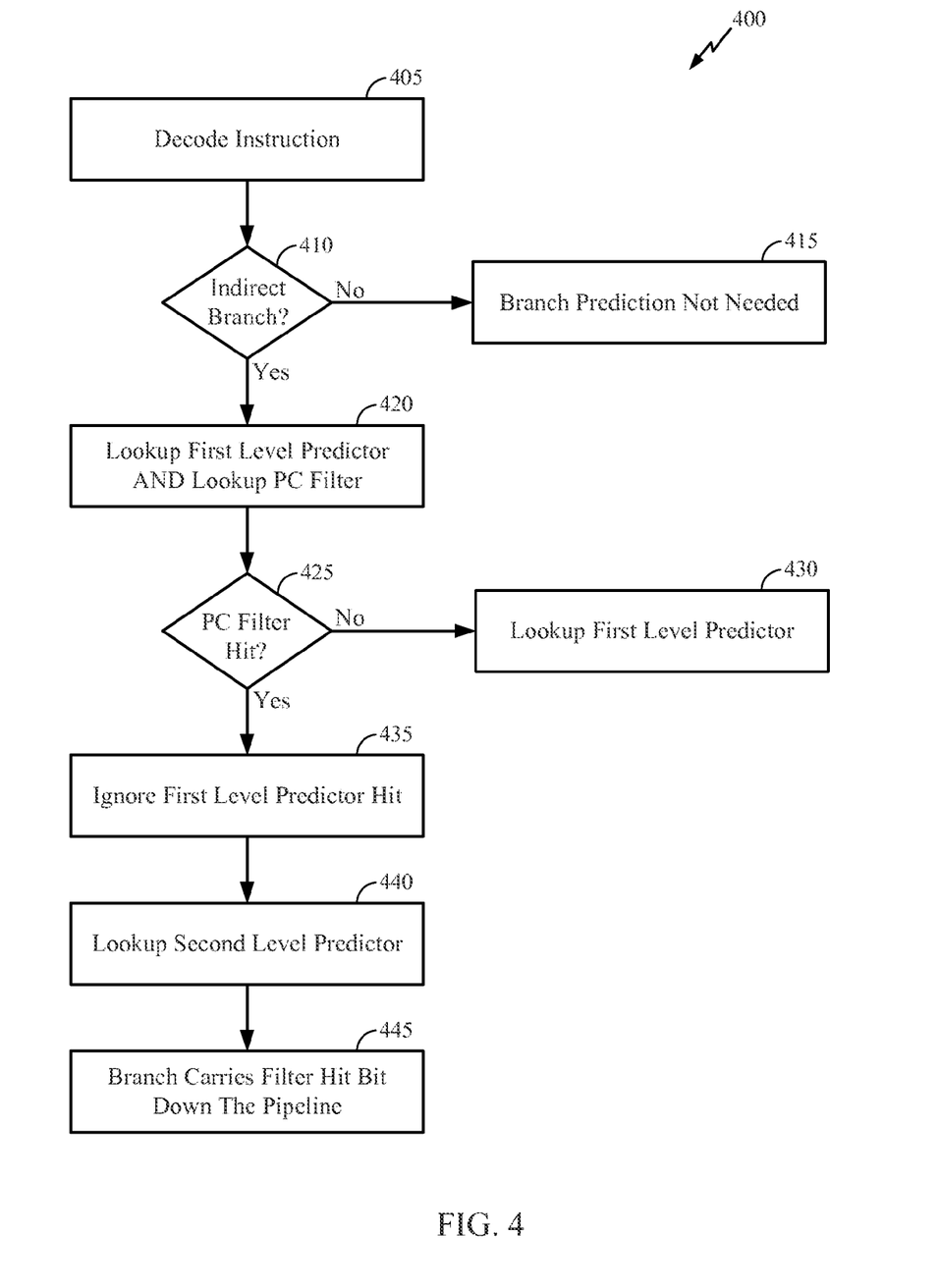
FIG. 4 illustrates the operation of an indirect branch lookup according to at least one embodiment of the invention.

FIG. 4 illustrates a flowchart 400 of an example embodiment of the invention. At 405, processor 10 decodes an instruction. At 410, processor 10 determines whether or not the instruction is an indirect branch instruction. If it is not an indirect branch, no branch prediction is necessary (415) and processor 10 executes the instruction normally.

If the instruction is an indirect branch, however, then at 420, processor 10 checks first level predictor 56 and PC filter 54 for the PC of the branch. If, at 425, the PC hits in first level predictor 56 and misses in PC filter 54, then at 430, the corresponding target address allocated in first level predictor 56 is retrieved. If there is a miss in both PC filter 54 and first level predictor 56, there is no prediction for the branch and the PC and the target address will be allocated in first level predictor 56.

If at 425, however, the PC hits in PC filter 54, then at 435, processor 10 ignores any hit in first level predictor 56 because the hit in PC filter 54 indicates that the branch is a polymorphic indirect branch. At 440, the PC is XOR-ed with the global branch history and looked-up in second level predictor 58. At 445, the branch instruction carries a bit indicating the PC filter hit with itself down the instruction pipeline. Setting the hit bit indicates that the branch should not be allocated in first level predictor 56 at retirement time, as discussed below with reference to FIG. 4. This keeps branches that should be predicted using second level predictor 58 in only second level predictor 58.

Figure 5:
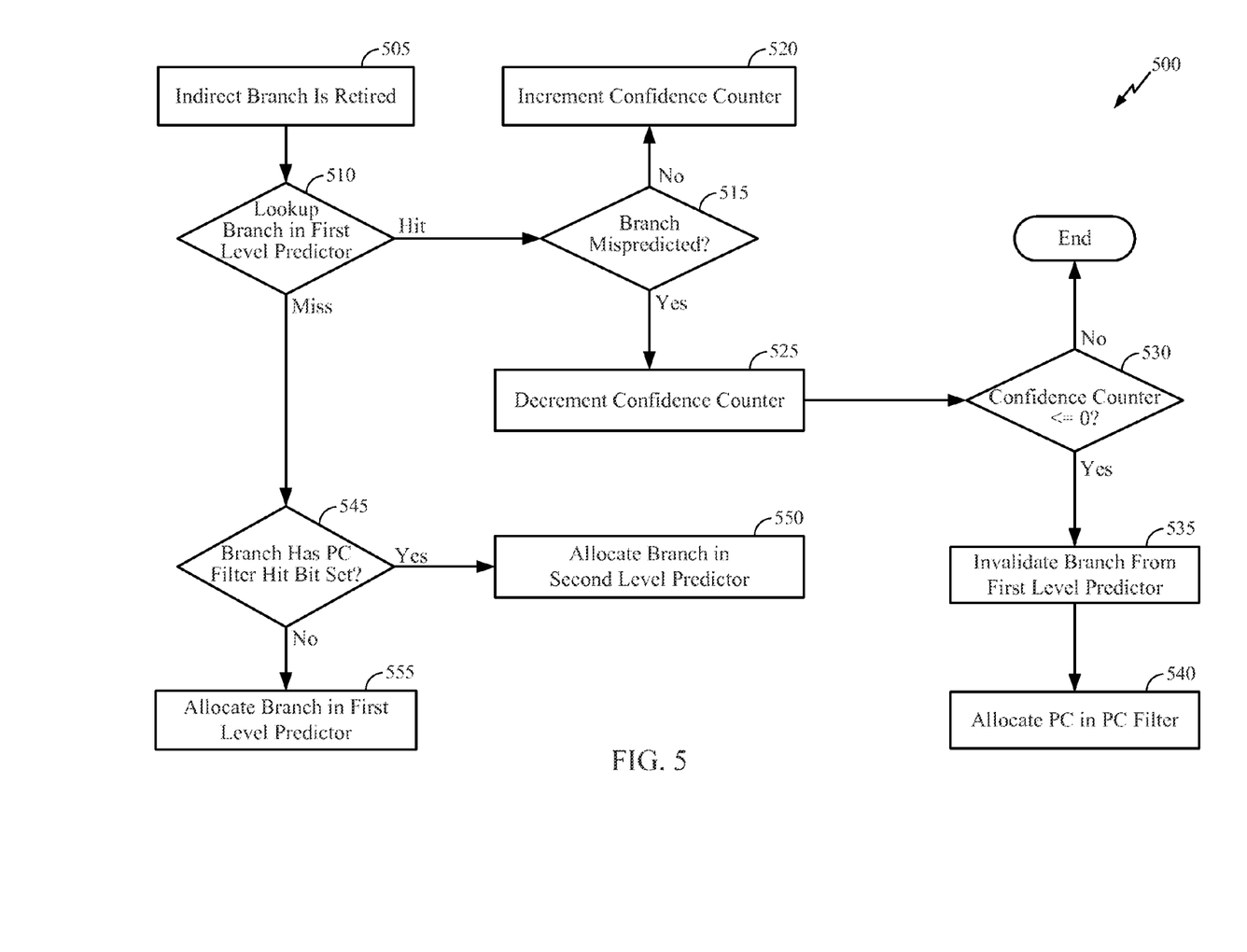
FIG. 5 illustrates the retirement of an indirect branch and the update or allocation of the first and second level predictors and the PC filter.

FIG. 5 illustrates a flowchart 500 of an example embodiment of the invention. At 505, an indirect branch has been executed (i.e. retired). At 510, the PC for the branch is looked-up in first level predictor 56. If there's a hit, then at 515, processor 10 determines whether the branch was mispredicted by first level predictor 56. If it was not, then at 520 the confidence counter is incremented, provided it has not already saturated to the high value threshold. If, however, the branch was mispredicted, then at 525, the confidence counter is decremented to indicate a decreased confidence in the ability of first level predictor 56 to accurately predict the target of the branch.

At 530, processor 10 determines whether the confidence counter is less than or equal to the no-confidence threshold (e.g. 0). If it is, then at 535, the branch is removed from first level predictor 56 and, at 540, the PC is allocated in PC filter 54. If the confidence counter is still greater than zero, however, no further action is taken and the retirement processing ends.

If the first level predictor 56 lookup at 510 misses, then at 545, the branch instruction is checked to determine whether the PC filter hit bit is set. In an alternate embodiment, the PC is looked-up in PC filter 54. If the hit bit is set, then at 550, the branch is allocated in second level predictor 58, if not already allocated, because it is polymorphic. The hit bit prevents the branch from being allocated in first level predictor 56. If, however, the hit bit is not set, then at 555, the branch is allocated in first level predictor 56.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for predicting simple and polymorphic branch instructions. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for predicting simple and polymorphic branch instructions, comprising:
   detecting that a program instruction is an indirect branch instruction;
   determining whether a program counter for the indirect branch instruction is stored in a program counter filter;
   based on the program counter not being stored in the program counter filter and being stored in a first level predictor, retrieving a predicted target for the indirect branch instruction from the first level predictor; and
   based on the program counter being stored in the program counter filter, accessing a second level predictor with the program counter and a global history for the indirect branch instruction as a tag to determine whether there is a predicted target for the indirect branch instruction, and setting a program counter filter hit bit in the indirect branch instruction, wherein the indirect branch instruction carries the program counter filter hit bit down an instruction pipeline to indicate that the indirect branch instruction should not be allocated in the first level predictor when the indirect branch instruction is retired.

2. The method of claim 1, further comprising:
   retiring the indirect branch instruction and, based on the program counter combined with a global branch history not being stored in the second level predictor, storing the program counter combined with the global branch history and a target of the indirect branch instruction in the second level predictor.

3. The method of claim 1, wherein the second level predictor is used to predict the polymorphic branch instructions.

4. The method of claim 1, further comprising:
   retiring the indirect branch instruction; and
   allocating the indirect branch instruction in the first level predictor based on the program counter not being stored in the first level predictor and the program counter filter hit bit for the indirect branch instruction not being set.

5. The method of claim 4, storing the program counter combined with a global branch history and a target of the indirect branch instruction in the second level predictor based on the program counter not being stored in the first level predictor and the program counter filter hit bit for the indirect branch instruction being set.

6. The method of claim 1, further comprising:
   based on the predicted target of the indirect branch instruction being a correct target, incrementing a confidence counter associated with the indirect branch instruction upon retirement of the indirect branch instruction; and
   based on the predicted target of the indirect branch instruction not being the correct target, decrementing a confidence counter associated with the indirect branch instruction upon retirement of the indirect branch instruction.

7. The method of claim 6, further comprising:
   based on the confidence counter being less than or equal to a threshold, removing the program counter from the first level predictor and storing the program counter in the program counter filter.

8. The method of claim 1, wherein the first level predictor is used to predict simple branch instructions.

9. An apparatus for predicting simple and polymorphic branch instructions, comprising:
   logic configured to detect that a program instruction is an indirect branch instruction;
   logic configured to determine whether a program counter for the indirect branch instruction is stored in a program counter filter;
   logic configured to retrieve a predicted target for the indirect branch instruction from a first level predictor based on the program counter not being stored in the program counter filter and being stored in the first level predictor; and
   logic configured to access a second level predictor with the program counter and a global history for the indirect branch instruction as a tag to determine whether there is a predicted target for the indirect branch instruction, and to set a program counter filter hit bit in the indirect branch instruction, wherein the indirect branch instruction carries the program counter filter hit bit down an instruction pipeline to indicate that the indirect branch instruction should not be allocated in the first level predictor when the indirect branch instruction is retired, based on the program counter being stored in the program counter filter.

10. The apparatus of claim 9, further comprising:
    logic configured to store, upon retirement of the indirect branch instruction and based on the program counter combined with a global branch history not being stored in the second level predictor, the program counter combined with the global branch history and a target of the indirect branch instruction in the second level predictor.

11. The apparatus of claim 9, wherein the second level predictor is used to predict polymorphic branch instructions.

12. The apparatus of claim 9, further comprising:
logic configured to allocate the indirect branch instruction to the first level predictor based on the program counter not being stored in the first level predictor and the program counter filter hit bit for the indirect branch instruction not being set upon retirement of the indirect branch instruction.

13. The apparatus of claim 12, further comprising:
logic configured to store, based on the program counter not being stored in the first level predictor and the program counter filter hit bit for the indirect branch instruction not being set, the program counter combined with a global branch history and a target of the indirect branch instruction in the second level predictor.

14. The apparatus of claim 9, further comprising:
logic configured to increment a confidence counter associated with the indirect branch instruction upon retirement of the indirect branch instruction based on the predicted target of the indirect branch instruction being a correct target; and
logic configured to decrement the confidence counter associated with the indirect branch instruction upon retirement of the indirect branch instruction based on the predicted target of the indirect branch instruction not being the correct target.

15. The apparatus of claim 14, further comprising:
logic configured to remove, based on the confidence counter being less than or equal to a threshold, the program counter from the first level predictor and sto store the program counter in the program counter filter.

16. The apparatus of claim 9, wherein the first level predictor is used to predict simple branch instructions.

17. An apparatus for predicting simple and polymorphic branch instructions, comprising:
means for detecting that a program instruction is an indirect branch instruction;
means for determining whether a program counter for the indirect branch instruction is stored in a program counter filter;
means for retrieving a predicted target for the indirect branch instruction from a first level predictor based on the program counter not being stored in the program counter filter and being stored in a first level predictor; and
means for accessing a second level predictor with the program counter and a global history for the indirect branch instruction as a tag to determine whether there is a predicted target for the indirect branch instruction, and setting a program counter filter hit bit in the indirect branch instruction, wherein the indirect branch instruction carries the program counter filter hit bit down an instruction pipeline to indicate that the indirect branch instruction should not be allocated in the first level predictor when the indirect branch instruction is retired, based on the program counter being stored in the program counter filter.

* * * * *